United States Patent Office 3,839,462
Patented Oct. 1, 1974

3,839,462
FLUORINATED PEROXIDES
L. Ray Anderson, Morristown, N.J., William B. Fox, Alexandria, Va., and Frederick J. Gefri, Irvington, N.J., assignors to Allied Chemical Corporation, New York, N.Y.
No Drawing. Filed Jan. 12, 1972, Ser. No. 217,232
Int. Cl. C07c 73/00
U.S. Cl. 260—610 R       14 Claims

ABSTRACT OF THE DISCLOSURE

Novel peroxides having the formula

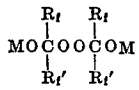

wherein M is an alkali metal and $R_f$ and $R_f'$ are fluoroperhaloalkyl radicals are prepared by reacting an alkali metal peroxide with a fluoroperhalo ketone of the formula $R_fR_f'C=O$. The peroxides are useful as free radical initiators for the polymerization of olefins, especially fluoroolefins.

---

In accordance with this invention, novel peroxides having the formula

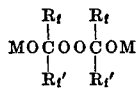

wherein M is an alkali metal and $R_f$ and $R_f'$ are independently fluoroperhaloalkyl radicals having the formula $-CF_2(CFX)_nX$ wherein X is fluorine or chlorine and $n$ is 0 to 5, are prepared by reacting, under substantially anhydrous conditions, an alkali metal peroxide with a fluoroperhalo ketone of the formula $R_fR_f'C=O$, as represented by the following equation:

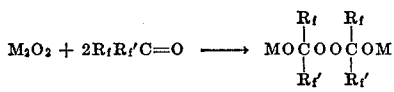

In the preferred embodiments of this invention, M is lithium, sodium or potassium, preferably sodium; X is fluorine; and $n$ is 0 or 1. In especially preferred embodiments, $R_f$ is trifluoromethyl and $R_f'$ is trifluoromethyl or chlorodifluoromethyl, preferably trifluoromethyl.

The reaction is conveniently carried out at room temperature. If desired, however, the reaction can be carried out at temperatures above or below room temperature, such as, for example, from about 0° C. to 50° C., preferably 0° C. to 40° C.

The reaction is conveniently carried out under autogenous pressures, ranging from about 50 to 150 p.s.i.g., but the reaction pressure is not especially critical.

The reaction can be carried out in the absence of other materials, but it is desirable to carry out the reaction in the presence of an inert liquid diluent, preferably a diluent which is a solvent for the product. The product is soluble in polar organic solvents, such as acetonitrile.

The reactants may be added to the reaction mixture in any order and in any desired proportion. However, it is desirable to use a slight excess of the fluoroperhaloketone to ensure complete reaction with the alkali metal peroxide. The product is then conveniently recovered as a solid by evaporation of the reaction mixture to remove unreacted fluoroperhaloketone and the diluent, if any.

The novel peroxides of this invention are useful to initiate polymerization of olefins, especially fluoroolefins, such as, in particular, fluoroperhalo-alpha-olefins having 2 to 5 carbon atoms, e.g., tetrafluoroethylene and chlorotrifluoroethylene. Except for the use of a peroxide of this invention as the initiator, the polymerization is carried out in accordance with conventional methods for polymerizing such olefins in the presence of a catalytic amount of a free radical initiator. Typically such methods comprise polymerizing the olefin in an aqueous medium at a temperature of from about 0 to 80° C. and a pressure of from 15 to 500 p.s.i.g. The aqueous medium is usually buffered to a pH between 7 and 11. The peroxides of this invention are employed in a catalytic amount sufficient to initiate polymerization. Preferably this amount corresponds to a concentration of from about 0.1 to 2.0 percent by weight in the aqueous medium.

EXAMPLE 1

A substantially anhydrous reaction mixture consisting of about 20.8 grams (125 mmoles) of hexafluoroacetone and 3.9 grams (50 mmoles) of sodium peroxide in 50 ml. of acetonitrile was stirred in a sealed reactor at room temperature for two days, during which time the solid sodium peroxide dissolved to give a clear viscous solution. Evaporation of the solution under vacuum to remove the acetonitrile and excess hexafluoroacetone left a white solid product, which was identified by modern analytical techniques as having the formula $$NaOC(CF_3)_2OOC(CF_3)_2ONa$$

The product was soluble in water, acetonitrile and other polar organic solvents, but not in nonpolar organic solvents. It was strongly oxidizing toward KI.

The approximate half-life values for $$NaOC(CF_3)_2OOC(CF_3)_2ONa$$

at various temperatures and pH values were determined iodometrically to be as follows:

| pH | Temperature,° C. | Half-life, hours |
|---|---|---|
| 8.0 | 5 | 1 |
| 8.6 | 5 | 58 |
| 9.3 | 5 | 80 |
| 9.3 | 25 | 5 |
| 9.6 | 25 | 7 |

EXAMPLE 2

Tetrafluoroethylene was polymerized at 25° C. and 300 p.s.i.g. in a buffered (pH=9.5) medium containing 0.5 percent by weight of $NaOC(CF_3)_2OOC(CF_3)_2ONa$.

EXAMPLE 3

Chlorotrifluoroethylene was polymerized at 0–5° C. and 75 p.s.i.g. in a buffered (pH=9.5) aqueous medium containing 0.5 percent by weight of $$NaOC(CF_3)_2OOC(CF_3)_2ONa$$

We claim:
1. A peroxide having the formula

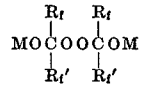

wherein M is an alkali metal and $R_f$ and $R_f'$ are independently fluoroperhaloalkyl radicals having the formula $-CF_2(CFX)_nX$ wherein X is fluorine or chlorine and $n$ is 0 to 5.
2. The peroxide of claim 1 wherein X is fluorine.
3. The peroxide of claim 1 wherein $n$ is 0.
4. The peroxide of claim 3 wherein X is fluorine.
5. The peroxide of claim 4 wherein M is lithium, sodium or potassium.
6. The peroxide of claim 1 wherein $R_f$ is trifluoromethyl and $R_f'$ is chlorodifluoromethyl.

7. A peroxide having the formula $$NaOC(CF_3)_2OOC(CF_3)_2ONa$$

8. A process for preparing a peroxide having the formula

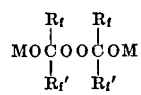

wherein M is an alkali metal and $R_f$ and $R_f'$ are independently fluoroperhaloalkyl radicals having the formula $-CF_2(CFX)_nX$ wherein X is fluorine or chlorine and $n$ is 0 to 5, which process comprises reacting at a temperature in the range of about 0° C. to 50° C., under substantially anhydrous conditions and autogeneous pressures, an alkali metal peroxide with a fluoroperhaloketone having the formula $R_fR_f'C=O$ wherein $R_f$ and $R_f'$ are as defined above.

9. The process of claim 8 wherein the alkali metal peroxide is lithium peroxide, sodium peroxide or potassium peroxide.

10. TThe process of claim 8 wherein X is fluorine.

11. The process of claim 8 wherein $n$ is 0.

12. The process of claim 11 wherein X is fluorine.

13. The process of claim 8 wherein $R_f$ is trifluoromethyl and $R_f'$ is chlorodifluoromethyl.

14. A process for preparing peroxide having the formula $NaOC(CF_3)_2OOC(CF_3)_2ONa$ which comprises reacting at a temperature in the range of about 0° C. to 50° C. under substantially anhydrous conditions and autogenous pressures sodium peroxide with hexafluoroacetone.

References Cited
UNITED STATES PATENTS

| | | | |
|---|---|---|---|
| 2,568,682 | 9/1951 | Levesque | 260—610 R |
| 3,047,406 | 7/1962 | Ferrani | 260—610 R |
| 3,235,584 | 2/1966 | Blumberg | 260—610 R |

BERNARD HELFIN, Primary Examiner

W. B. LONE, Assistant Examiner

U.S. Cl. X.R.

260—92.1